UNITED STATES PATENT OFFICE.

ADOLPHE CHALAS, OF PARIS, FRANCE.

METHOD OF PREPARING MEAT EXTRACT IN A DRY STATE.

1,414,177.  Specification of Letters Patent.  Patented Apr. 25, 1922.

No Drawing.   Application filed July 10, 1919.  Serial No. 309,850.

*To all whom it may concern:*

Be it known that I, ADOLPHE CHALAS, a citizen of the Republic of France, and residing at Paris, Seine Department, No. 46 Rue Emile Menier, in the Republic of France, engineer, have invented certain new and useful Methods of Preparing Meat Extract in a Dry State, of which the following is a specification.

Up to the present, raw meat has been prepared for preserving in the form of powder obtained by desiccation, at a lukewarm or hot temperature, of the raw muscular flesh, pulped, then pounded and when dry pulverized.

Under these conditions, the specific nutritive principles of the muscular juice (plasma) are destroyed or modified and the muscular fibrine (myogene-fibrine, etc.) remains insoluble. This powder is consumed diluted with an aqueous liquid.

In order to obtain a liquid product constituting a beverage, recourse is had to the isolated plasma, which is the most active alimentary component of raw meat, and which is separated from the muscular residue by expression. This plasma, being very subject to change by the rapid action of the germs of putrescence as well as under the influence of heat, must have added to it, cold, a preservative substance, generally glycerine, which has to be incorporated with it in fairly heavy proportion, varying from about one-quarter to one-half of its volume, in order that its action may be certain, the result being that the products thus obtained inevitably manifest the properties, laxative and irritating to the digestive tracts, inherent in glycerine.

The product and its mode of preparation which are the subject of the present invention differ widely from what has just been summarily stated, in this sense that the plasma and the muscular fibrine are treated separately, so that the preparation of the one cannot be prejudicial to that of the other.

On the one hand, the plasma is brought by the process described below to the form of a dry extract, soluble in cold water and preserving all its rawness, whilst on the other hand the muscular residue is brought, by the ordinary processes, to the condition of albumoses or peptones, practically pure or mixed in determined proportions, likewise dried and soluble in cold water.

These two extracts, mixed in proportions approximating to those in which they are found in the raw meat when they come, completely restores the latter, and their preservation, when exempt from humidity, is indefinite.

In this process, beef, horse-flesh or mutton, etc., is first of all prepared by the ordinary methods of expression, either immediately after slaughtering or on leaving the refrigerator. Before being pressed and pulped the bundles of vascular-nervous substance and the fibres and tendons, are removed.

The muscular juice (plasma) expressed is allowed to stand in the refrigerator until clarification by spontaneous precipitation of the coagulated myosine, which is separated by filtration, or better by precipitation and centrifugalizing, in order to be further treated with the insoluble residue.

The clarified plasma is then put to evaporate in a practically perfect vacuum, in the presence of substances readily absorbing the water evaporated, such as concentrated sulphuric acid (66° B.), anhydrous chloride of calcium or chloride of zinc, etc., which causes a lowering of temperature that may very rapidly give rise to the freezing of the plasma.

In order to keep this juice in a liquid state whilst maintaining it at a temperature in the neighbourhood of the freezing point thereby preventing any action of microbes during evaporation, sufficient heat is introduced in order to obtain this result, either by a coil or radiator in which tepid water or air circulates, or by electrical resistance, inside the evaporator receiver; or by a water-bath or other suitable arrangement outside the evaporator, this introduction of heat being easily regulated so that one may be able to compensate for the lowering of temperature due to the evaporation without, however, allowing this temperature to rise appreciably above the freezing point of the liquid plasma.

In order to maintain a practically perfect vacuum within the evaporator, the latter is made completely tight by means of the devices generally used to this end, such as, for instance, movable closure by autoclave obturators with machined surfaces, coated with wax-like substances forming a perfect joint under the atmospheric pressure. On the other hand the movable rods and shafts forming the mechanical transmissions of motion from the exterior to the interior of the vessels are tightly enclosed in stuffing boxes immersed in oil and provided with cup leathers, if necessary, so as to prevent any re-entrance of air.

With the same object in view, the horizontal cocks (or taps) may consist of long bodies ground in, and the vertical cocks (or taps) of bodies likewise ground in, immersed in and surrounded by oil.

This vacuum is produced by pumps or blowers, or more generally by any suitable devices excluding those necessitating the introduction of hot water steam into the vessels containing the raw plasma.

The evaporator communicates by a wide conduit with the vessels in which the water evaporated from the plasma is absorbed. The absorbing substance contained in this vessel must be sufficiently active to assimilate the water as quickly as it evaporates.

A simple refrigerating condenser may be used in the case of rapid evaporation of the juice introduced in drops or in the form of spray as its desiccation proceeds, but the employment of substances readily absorbing water is much more efficacious.

Concentrated sulphuric acid of 66° B. is preferably used whenever the factory is situated so as to be able to easily procure this product and to resell without difficulty the hydrated acid resulting therefrom as a by-product.

It is to be understood that the hydrated acid is the sulfuric acid which has absorbed water to a point where it cannot be efficiently used any more as an absorbent.

In such case, the absorbing vessel, made of lead or other suitable material, is furnished with a stirrer constantly renewing the absorbing surface of the acid.

In the contrary event, anhydrous chloride of zinc, very absorbent and easy to de-hydrate by slight calcination, is preferably employed.

It rapidly becomes pasty by hydration.

It is stirred by a slow stirrer during the whole of its action and finally evacuated in the state of aqueous solution for the purpose of being regenerated.

Chloride of calcium or any other similar absorbent may also be used.

The plasma is introduced into the evaporator either all at once or as the operation proceeds.

In the former case, the juice is suitably stirred so as to increase its surface of evaporation, and is maintained in the state of a thin falling liquid sheet or drops inside the apparatus by means of stirrers arranged to this effect.

It is preferable, in that case, to effect the evaporation in two operations:

The first, in a concentrating evaporator, bringing the juice to a very concentrated but still liquid condition; the second, in a desiccating evaporator of smaller volume, where the concentrate is brought to the condition of solid crusts, or flakes showing a shiny fracture of deep garnet-red colour, easily detachable from the sides of the vessel.

The stirrers working in the concentrating evaporator may be replaced by one or more cylinders revolving horizontally on shafts provided with the air-tight devices previously mentioned.

The cylinder, slightly heated internally by circulation of tepid air, or any other means, to supply the necessary heat, dips with its lower part into the juice to be evaporated; this juice adheres in thin pellicles to the rising surface on which it dries completely, the speed of rotation of the cylinder regulated to this effect.

The descending portion of the surface of the cylinder is scraped by a blade which detaches therefrom the dry material and causes it to fall into a lateral compartment, separated from that containing the liquid juice.

The apparatus is opened and emptied when the whole of its contents is dried, and then re-charged with juice for a fresh operation.

In the second case, that is to say, when the plasma is introduced into the evaporator as the operation proceeds, the juice is introduced into the evaporator continuously and in a manner varying according to the device adapted for the evaporation.

For instance, if that device is cylindrical, as has just been stated in the previous case, the juice falls in drops on the upper part of the cylinder and in a quantity so regulated as to be dried during three-quarters of its rotation.

Towards the half of the last quarter of a circle to be traversed, the solid pellicle meets with the blade which detaches it and causes the crust to fall to the bottom of the receptacle where there is no liquid substance.

Finally, if no mechanical desiccating device be employed, the juice is introduced, under atmospheric pressure, by a very small orifice, in front of which the tiny jet comes into collision with an arrrangement (tourniquet or other) which divides it into a fine spray throughout the whole of the receptacle except near the top, where electric incandescent lamps are fitted up in the form of a crown and radiate towards the lower part, thus furnishing the supply of heat by radiation on the eveporated spray, the whole being so regulated that the particles fall in an impalpable powder to the bottom of the evaporator.

In this last particular case, as evaporation is very rapid, there is no objection to introducing the juice in a tepid condition, for there is no time for fermentation to set in before desiccation.

All that is needed is not to raise the temperature beyond that at which there would be risk of the raw state of the juice being modified, i. e., about 35° to 40° C.

Whatever may be the mode of evaporation used—and it is evident that numerous contrivances are possible amongst the evaporation devices just described, and which all emanate from the same principles—the extract is put back to dry more thoroughly, either in the presence of the dehydrating substances already indicated, or in a stove in which dry air circulates, the temperature of which does not exceed 35 to 40° C., and then pulverized if it is not so already.

This dry powder, finally unchangeable, protected from damp, and passed through a sieve No. 100, is of a light brownish colour acquiring a somewhat yellowish tint, when it is brought to a perfectly impalpable condition.

It has a slight odour of meat and milk—sui generis—dominated by the more pronounced odour of a dry substance similar, for instance, to bread crust.

It is rapidly soluble in cold water, and its solution has a slight flavour reminding one a little of that of cooked meat extracts.

Its yield is at least 4 per cent of the weight of the meat pressed in order to obtain it.

As for the insoluble residue of muscular fibrine, it is treated by the ordinary processes of transformation of albuminoid substances into soluble products, such as albumose, either practically pure or containing a certain quantity of dry peptones, provided that the action of the soluble ferment used (pepsine, papaine) is interrupted before the end or cleavage of the fibrine, when amine acids may be produced (leucine, tyrosine) of a more or less toxic character.

The fact that the active principles of the raw plasma are changed at the temperatures required for these transformations (40° and above) accounts for the utility of carrying out separately the treatment of the muscular juice.

The pure or peptonized albumoses are finally mixed with the dry extract of plasma, and the product so obtained entirely reconstitutes the raw meat from which it originates.

In order to obtain the complete extract in an entirely homogeneous form it is preferable to admix the concentrated solutions of plasma and albumose and to finish the evaporation of the mixture in the desiccating evaporator.

The solid product is then desiccated and pulverized as stated above.

It is quite evident that the relative proportions of the dry plasma and the albumose may be modified according to requirements, increasing, if necessary, the quantity of dry plasma; the latter may even be consumed in its pure state, which increases to the maximum the tonic properties of this food.

It is finally likewise evident that the muscular plasma concentrated at a temperature in the neighbourhood of melting ice by the process described, and mixed or not with pure or peptonized albumose, may be preserved in the liquid state by the addition of glycerine or other preservative substances, such as those in use for the unevaporated plasma.

The concentrated mixture has the advantage that it can be imbibed after a large addition of water, which further dilutes the glycerine and thus largely removes its drawbacks.

Claims:

1. A method of preparing meat extract in the dry state and soluble in water, consisting in the extraction of the juice or liquid plasma from the muscular fibrine by pressing the same, and in submitting the said plasma to a rapid evaporation in a high vacuum and at low temperature, the plasma being admitted into the evaporating device after cooling the said plasma to a temperature slightly above the freezing point thereof, it being maintained at this temperature by a suitable heating as the evaporation takes place.

2. A method of preparing meat extract in the dry state and soluble in water, consisting in the extraction of the juice of raw meat and in the evaporation of the said juice in a high vacuum and at a low temperature in a closed receptacle to a suitable degree of concentration, and in the desiccation of the said concentrated juice in a second receptacle likewise by the effect of a vacuum.

3. A method of preparing meat extract in the dry state and soluble in water, consisting in the evaporation of the juice of raw meat in a high vacuum at a low temperature but which is not sufficient to attain the freezing point of the juice, the liquid juice while under concentration being stirred by suitable means for the purpose of increasing the surface and accelerating the evaporation thereof.

4. A method of preparing meat extract in the dry state and soluble in water, consisting in the evaporation of the juice of raw meat in a high vacuum and at a temperature very slightly above the freezing point of the said juice in an evaporating device having disposed therein revoluble cylinders provided with interior heating and partially immersed in the liquid, the plasma drawn upon the said cylinders and dried thereon being removed by knives scraping the surface of the said cylinders.

5. A method of preparing meat extract in the dry state and soluble in water, consisting in causing the juice of raw meat to fall drop by drop within a closed receptacle having maintained therein a high vacuum and a low temperature, the drops of juice falling upon a revoluble cylinder disposed within the said receptacle and upon which the said liquid is caused to evaporate, the plasma remaining on the cylinder being removed from the surface thereof as it becomes dried, by means of knives scraping the said surface.

6. A method of preparing meat extract in the dry state and soluble in water, consisting in injecting the juice of raw meat into an evaporating device having maintained therein a high vacuum and a low temperature, an obstacle being disposed within the said evaporating device and adapted for breaking up the jet of meat juice.

7. A method of preparing meat extract in the dry state and soluble in water, consisting in pressing the raw meat, in separately collecting the juice and the pressed meat, in evaporating the juice in a high vacuum and at low temperature and in adding the said pressed meat to the said juice concentrated in the vacuum.

8. A method of preparing meat extract in the dry state and soluble in water, consisting in pressing the raw meat, in separately collecting the juice and the pressed meat, in evaporating the juice in a high vacuum and at low temperature in extracting the albumoses from the said pressed meat, and in mixing the said albumoses with the said concentrated juice.

In testimony that I claim the foregoing as my invention I have signed my name in presence of two subscribing witnesses.

ADOLPHE CHALAS.

Witnesses:
JOHN F. SIMONS,
MAURICE ROUX.